US 9,448,106 B2

(12) United States Patent
Murata et al.

(10) Patent No.: US 9,448,106 B2
(45) Date of Patent: Sep. 20, 2016

(54) OPTICAL SENSOR

(71) Applicant: OMRON CORPORATION, Kyoto (JP)

(72) Inventors: Kenji Murata, Kyoto (JP); Kenta Yamakawa, Kyoto (JP); Kosuke Uemura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 14/030,220

(22) Filed: Sep. 18, 2013

(65) Prior Publication Data

US 2014/0118727 A1    May 1, 2014

(30) Foreign Application Priority Data

Oct. 30, 2012  (JP) ................................. 2012-239571

(51) Int. Cl.
| | |
|---|---|
| G01J 1/42 | (2006.01) |
| G01B 11/02 | (2006.01) |
| G01S 7/481 | (2006.01) |
| G01S 17/48 | (2006.01) |

(52) U.S. Cl.
CPC ............... *G01J 1/42* (2013.01); *G01B 11/026* (2013.01); *G01S 7/4813* (2013.01); *G01S 17/48* (2013.01)

(58) Field of Classification Search
USPC ......... 356/213–225, 614–625; 250/205, 216, 250/222.1, 221, 226, 201.5
See application file for complete search history.

(56) References Cited

U.S. PATENT DOCUMENTS

| | | | |
|---|---|---|---|
| 4,306,147 A | 12/1981 | Fukuyama et al. | |
| 4,868,593 A * | 9/1989 | Takamura | G02B 7/32 356/3.06 |
| 5,159,378 A * | 10/1992 | Takada | G02B 7/32 356/3.02 |
| 5,790,259 A * | 8/1998 | Mizuhata et al. | 356/445 |
| 5,844,682 A | 12/1998 | Kiyomoto et al. | |
| 6,323,481 B2 * | 11/2001 | Ueki | 250/221 |
| 6,455,829 B1 * | 9/2002 | Fukumura | 250/201.5 |
| 7,098,441 B2 * | 8/2006 | Yamaguchi et al. | 250/221 |
| 7,639,373 B2 * | 12/2009 | Torii et al. | 356/614 |
| 8,675,209 B2 * | 3/2014 | Usami | 356/614 |
| 2002/0134909 A1 * | 9/2002 | Shiota et al. | 250/205 |
| 2008/0117531 A1 * | 5/2008 | Asper | G01V 8/12 359/710 |

(Continued)

FOREIGN PATENT DOCUMENTS

| | | |
|---|---|---|
| CN | 1122454 A | 5/1996 |
| CN | 1142608 A | 2/1997 |

(Continued)

OTHER PUBLICATIONS

Office Action in Chinese Application No. 201310421271.X, dated Jul. 2, 2015.

(Continued)

*Primary Examiner* — Sang Nguyen
(74) *Attorney, Agent, or Firm* — Greenblum & Bernstein, P.L.C.

(57) ABSTRACT

To provide an optical sensor that can ensure accuracy of positions of a light projecting unit and a light receiving unit in a case. The optical sensor includes a case, an integrated light projecting module that includes a light emitting unit and a light projecting lens, a light receiving unit configured to receive reflected light of light projected from the light projecting module, and a light receiving lens unit configured to form an image of the reflected light on the light receiving unit. The light projecting module, the light receiving unit, and the light receiving lens unit are each independently and directly fixed to the case.

8 Claims, 7 Drawing Sheets

(56) References Cited

U.S. PATENT DOCUMENTS

| | | | |
|---|---|---|---|
| 2010/0222684 A1* | 9/2010 | Hatzilias | G01B 11/25 600/476 |
| 2012/0154807 A1* | 6/2012 | Usami | 356/369 |

FOREIGN PATENT DOCUMENTS

| | | |
|---|---|---|
| CN | 102564316 A | 7/2012 |
| EP | 1116963 A2 | 7/2001 |
| EP | 1845401 | 10/2007 |
| EP | 2192420 | 6/2010 |
| EP | 2538172 | 12/2012 |
| EP | 2541575 | 1/2013 |
| JP | 6-276354 | 9/1994 |
| JP | 2001-267626 | 9/2001 |
| JP | 2005-164649 | 6/2005 |
| WO | 2012/042944 | 4/2012 |

OTHER PUBLICATIONS

English language machine translation of Office Action in Chinese Application No. 201310421271.X of Jul. 2, 2015.
Extended European Search Report in EP 13185879.7, dated Mar. 7, 2014.
Abstract of EP 1116963 of Jul. 18, 2001.
Japanese Office Action in JP 2012-239571, dated May 24, 2016, with partial English language translation.
Communication pursuant to Article 94(3) EPC in EP Application No. 13185879.7, dated Jul. 4, 2016.

* cited by examiner

OPTICAL SENSOR

CROSS REFERENCE TO RELATED APPLICATIONS

This application claims priority to Japanese Patent Application No. 2012-239571 filed on Oct. 30, 2012, the entire contents of which are incorporated by reference herein.

TECHNICAL FIELD

Disclosed herein is an optical sensor, particularly to a structure of an optical sensor.

BACKGROUND

Conventionally, various configurations have been proposed for the optical sensor. For example, Japanese Unexamined Patent Publication No. 2001-267626 discloses a configuration of a light projecting unit used in the optical sensor. The light projecting unit includes a laser diode, a light projecting lens (a collimate lens and a concave cylindrical lens), and a casing in which the laser diode and the light projecting lens are accommodated.

Generally the optical sensor includes not only the light projecting unit but also a light receiving unit. As used herein, the light receiving unit includes optical components, such as a light receiving element and a light receiving lens, which receive light.

Accuracy of positions of the light projecting unit and the light receiving unit in a case has an influence on performance of the optical sensor. For example, the light projecting unit emits the light to generate heat. The positions of the light projecting unit and the light receiving unit are changed by the heat to possibly change the performance of the optical sensor. However, Japanese Unexamined Patent Publication No. 2001-267626 discloses only the configuration of the light projecting unit used in the optical sensor (for example, a photoelectric switch), and does not suggest a solution to such problem.

SUMMARY

The embodiment has been devised to solve the problems described above, and an object thereof is to provide an optical sensor that can ensure the accuracy of the positions of the light projecting unit and the light receiving unit in the case.

In accordance with one aspect of the embodiment, an optical sensor includes: a case; a light projecting module that includes a light emitting unit and a light projecting lens, and integrates the unit and the lens; a light receiving unit configured to receive reflected light of light projected from the light projecting module; and a light receiving lens unit configured to form an image of the reflected light on the light receiving unit. In the optical sensor, the light projecting module, the light receiving unit, and the light receiving lens unit are each independently and directly fixed to the case.

According to the configuration, the light emitting unit and the light projecting lens are integrated by the light projecting module. Therefore, a position gap between the light emitting unit and the light projecting lens is reduced as much as possible. Necessity of a base member (for example, metal) to which the light projecting module, the light receiving unit, and the light receiving lens unit are attached is eliminated because the light projecting module, the light receiving unit, and the light receiving lens unit are independently and directly fixed to the case. Additionally, weight reduction and downsizing of the optical sensor can be achieved by eliminating the necessity of the base member.

Preferably, in the light projecting module, the light projecting lens is isotropically held down by and fixed to a light projecting lens holder in a direction perpendicular to an optical axis defined by the light projecting lens and the light emitting unit. The light receiving lens unit includes a light receiving lens and a light receiving lens holder configured to hold the light receiving lens. The light receiving lens is isotropically held down by and fixed to the light receiving lens holder in the direction perpendicular to an optical axis defined by the light receiving lens and the light receiving unit. The base, the light projecting lens holder, and the light receiving lens holder are all made of a resin or a glass-fiber reinforced resin.

According to the configuration, because the base, the light projecting lens holder, and the light receiving lens holder have the substantially identical linear expansion coefficient, expansion and contraction are generated also by a temperature change while the disposition relationship among the light emitting unit, the light projecting lens, the light receiving unit, and the light receiving lens is maintained at a similar shape. Therefore, a relationship between a light projecting optical axis, defined by the dispositions of the light emitting unit and the light projecting lens, and a light receiving optical axis, defined by the dispositions of the light receiving unit and the light receiving lens, is maintained to stabilize measurement accuracy.

Preferably, the case is made of a glass-fiber reinforced resin. The light projecting lens is made of a resin. The light projecting lens holder is made of the glass-fiber reinforced resin. The light receiving lens unit is made of the resin. The light receiving lens holder is made of the glass-fiber reinforced resin.

According to the configuration, the case is made of the glass-fiber reinforced resin to enhance shape accuracy. Therefore, the measurement accuracy can stably be maintained even if the lens is made of a usual resin having the linear expansion coefficient different from that of the case.

Preferably, the case is made of a resin having a linear expansion coefficient that is less than or equal to a linear expansion coefficient of a die-casting metal.

According to the configuration, expansion of the case due to the heat generation of the light emitting unit is reduced as much as possible. Accordingly, misalignment among the light projecting module, the light receiving unit, and the light receiving lens unit can be reduced. For example, the base member is produced by die-casting using a die-casting metal (such as aluminum, but may also be zinc and magnesium). Accordingly, the case is made of the resin having the linear expansion coefficient that is less than or equal to the linear expansion coefficient of the die-casting metal, which allows the case thermal expansion due to the heat generation of the light emitting unit to be reduced to less than or equal to the base member. Therefore, the misalignment among the light projecting module, the light receiving unit, and the light receiving lens unit, which are directly fixed to the case, can be reduced.

Preferably, the light projecting module includes: a light projecting unit holder in which the light emitting unit and the light projecting lens are accommodated; and a holding member configured to fix the light emitting unit accommodated in the light projecting unit holder. The holding member and the light projecting lens are fixed to the light projecting unit holder using an ultraviolet-curing adhesive. The light receiving unit includes a light receiving element that is disposed away from a circuit board, and the light receiving element is fixed to the case using the ultraviolet-curing adhesive.

According to the configuration, the light receiving element or the light emitting unit can be fixed without applying a stress. Usually the ultraviolet-curing adhesive (also called a UV adhesive) has a small linear expansion coefficient. Temperature compensation can be ensured (a position change due to a temperature is prevented) by fixing the light receiving element or the light emitting unit using the ultraviolet-curing adhesive. The light emitting unit is held by a holding plate after the light emitting unit is, for example press-fitted in the light projecting unit holder. The holding plate and light projecting unit holder are adhered to each other using the UV adhesive to be able to fix the light emitting unit. It is difficult that the light receiving unit in which the light receiving element and the processing board are integral with each other is fixed to the case using the ultraviolet-curing adhesive. Only the light receiving element can be fixed to the case using the ultraviolet-curing adhesive by separating the light receiving element and the circuit board from each other.

Preferably, the light projecting unit holder is made of a resin having a linear expansion coefficient that is less than or equal to a linear expansion coefficient of a die-casting metal.

According to the configuration, the expansion of the light projecting unit holder due to the heat generation of the light emitting unit is reduced as much as possible. Accordingly, the misalignment between the light emitting unit and the light projecting lens can be reduced.

Preferably, the light projecting module, the light receiving lens, and the light receiving unit are disposed such that a principal plane of the light receiving lens included in the light receiving lens unit, a light receiving plane of the light receiving unit, and the optical axis of the light projecting module intersect one another at one point.

According to the configuration, what is called a Scheimpflug disposition is implemented. Preferably, the optical sensor further includes a semiconductor integrated circuit configured to process a light reception signal from the light receiving unit. In the optical sensor, the semiconductor integrated circuit is disposed in the case while separated from the light projecting module.

According to the configuration, a possibility that the optical component is misaligned by the heat generated by the semiconductor integrated circuit can be reduced because the semiconductor integrated circuit that is of a potential heat source is separated from the light projecting module.

Preferably, the light projecting unit holder includes a cylindrical unit in which the light projecting lens is configured to be able to slide inside thereof. The light projecting lens is fixed to an inside of the cylindrical unit.

According to the configuration, the light projecting lens can easily be aligned after the light projecting lens is inserted in the cylindrical unit of the light projecting unit holder.

According to the prevent invention, the optical sensor that can ensure the accuracy of the positions of the light projecting unit and the light receiving unit in the case can be made.

DETAILED DESCRIPTION

Figure 1:
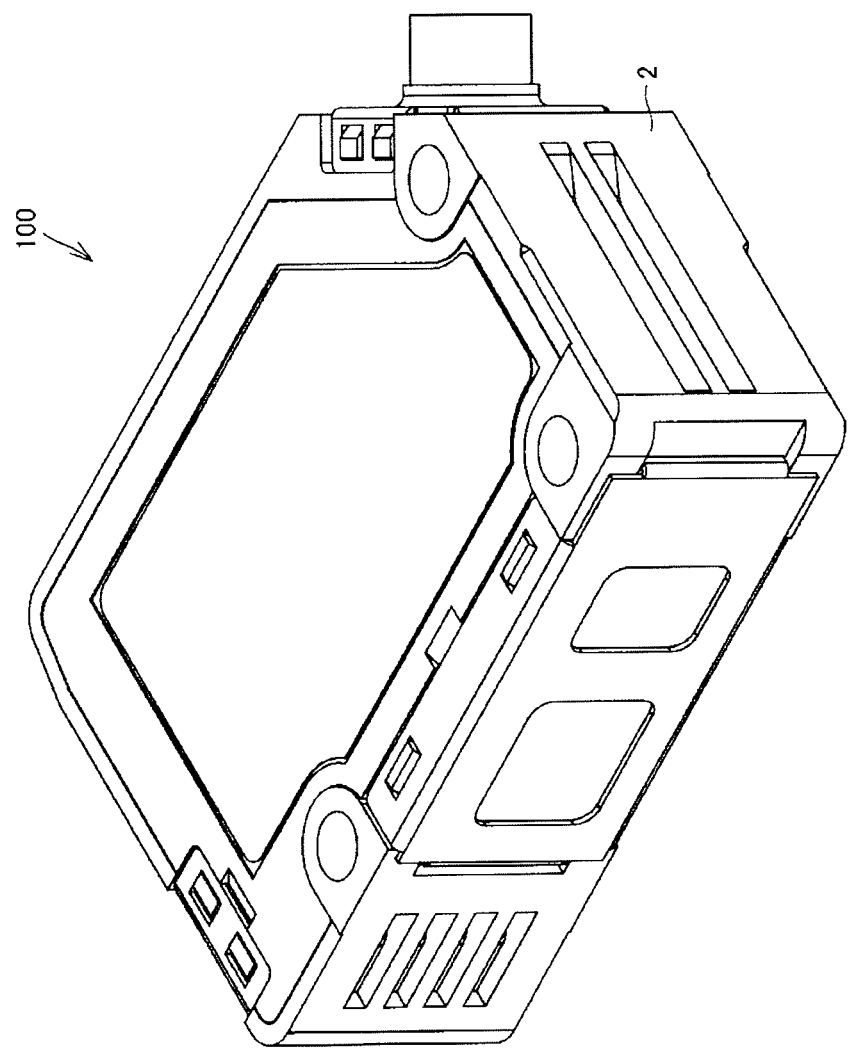
FIG. 1 is a perspective view illustrating an appearance of an optical sensor according to an embodiment of the present invention.

Hereinafter, an embodiment of the present invention will be described in detail with reference to the drawings. In the drawings, the identical or equivalent component is designated by the identical numeral, and the overlapping description is neglected.

Figure 2:
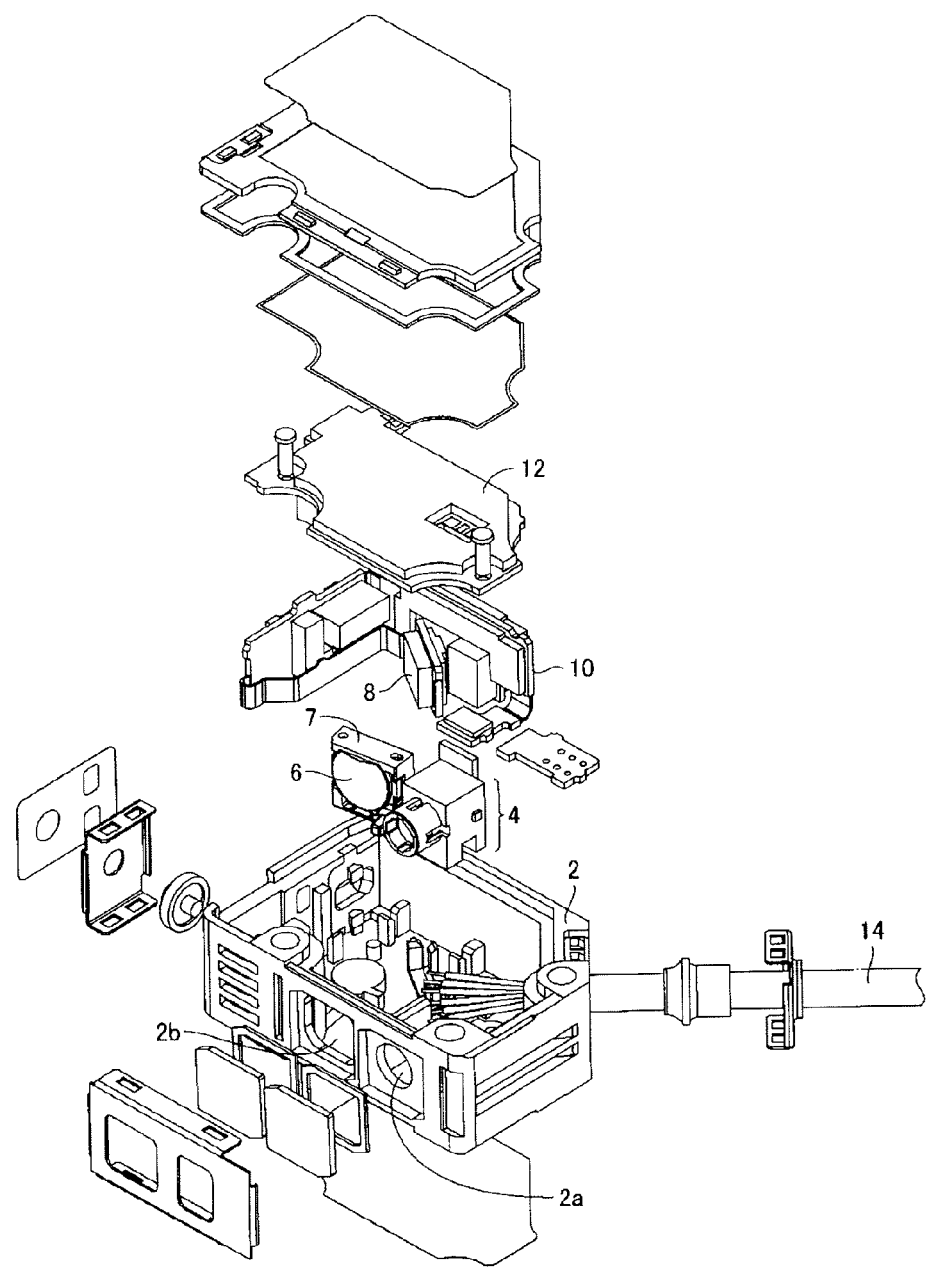
FIG. 2 is an exploded perspective view of the optical sensor in FIG. 1.

FIG. 1 is a perspective view illustrating an appearance of an optical sensor 100 according to an embodiment of the present invention. FIG. 2 is an exploded perspective view of the optical sensor 100 in FIG. 1. Referring to FIGS. 1 and 2, the optical sensor 100 detects, for example existence or non-existence of an object by light projection and light reception. There is no particular limitation to a use application of the optical sensor 100.

The optical sensor 100 includes a case 2, a light projecting module 4, a light receiving lens unit 7 including a light receiving lens 6, a light receiving unit 8, circuit boards 10 and 12, and a cable 14.

The case 2 accommodates the light projecting module 4, the light receiving lens unit 7 including the light receiving lens 6 and a light receiving lens holder, the light receiving unit 8, and the circuit boards 10 and 12. A light projecting window 2a and a light receiving window 2b are formed in the case 2.

The case 2 is made of a resin having a small linear expansion coefficient. For example, the case 2 is made of a glass-fiber reinforced resin. For example, glass-fiber reinforced PBT (polybutylene terephthalate) can be used as the glass-fiber reinforced resin. A resin having the linear expansion coefficient that is less than or equal to the linear expansion coefficient of a die-casting metal (for example, aluminum, but may also be zinc and magnesium) can be used. For example, because an aluminum die-casting alloy has the linear expansion coefficient of about $2 \times 10^{-5}$/° C., a material having the similar linear expansion coefficient can be used in the glass-fiber reinforced PBT that is of the material for the case 2. The material of the case 2 is not limited to PBT.

The light projecting module 4 includes a light emitting unit that emits light and a light projecting lens. The light emitted from the light emitting unit is projected to the outside of the optical sensor 100 from the light projecting window 2a of the case 2 through the light projecting lens. The light projected from the optical sensor 100 is reflected, and enter the light receiving lens 6 through the light receiving window 2b of the case 2. The light entered the light receiving lens 6 forms an image on a light receiving plane of the light receiving unit 8. A light receiving element such as a CMOS sensor or a CCD sensor is used as the light receiving unit 8.

The light receiving lens unit 7 includes the light receiving lens 6 that is made of a resin and a light receiving lens holder that is made of a glass-fiber reinforced resin to hold the light receiving lens 6. For example, the light receiving lens holder is made of the resin similar to that of the case 2, or another material having the similar linear expansion coefficient may be used. The light receiving lens 6 is isotropically held down by and fixed to the light receiving lens holder in a direction perpendicular to an optical axis. For example, after the light receiving lens 6 is press-fitted in an optical axis direction, the light receiving lens 6 is fixed while being held down in the optical axis direction or adhered thereto. In the fixing, the light receiving lens 6 may isotropically be held down in the direction perpendicular to the optical axis such that there is not left after the insertion a degree of movement freedom of an inside member due to the expansion in a specific or arbitrary one direction perpendicular to the optical axis. Therefore, even if the press-fitted member is made of the resin, the movement of a center position due to a temperature change becomes very small in the direction perpendicular to the optical axis.

The circuit boards 10 and 12 are a circuit that processes a light reception signal from the light receiving unit 8. For example, a power supply circuit and a signal processing circuit are mounted on the circuit boards 10 and 12. The power supply circuit and the signal processing circuit include a semiconductor integrated circuit. A signal generated by the signal processing circuit is transmitted to an amplifier unit (not illustrated) through the cable 14.

Figure 3:
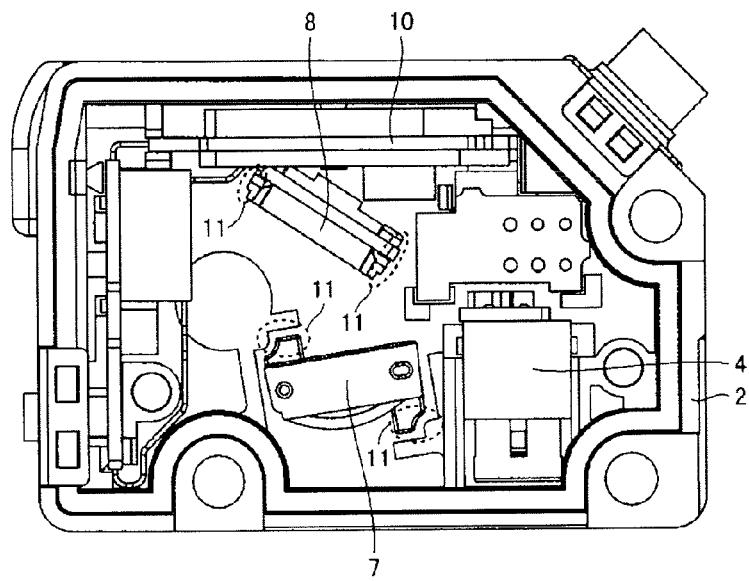
FIG. 3 is a view illustrating a configuration of an optical system in the optical sensor of the embodiment of the present invention.
Figure 4:
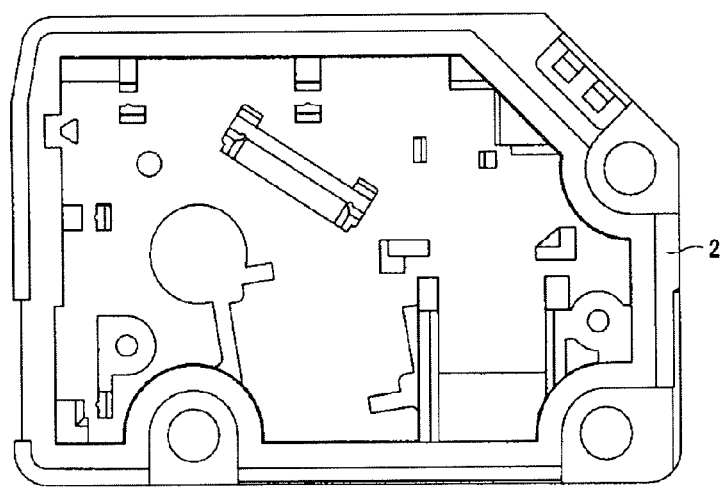
FIG. 4 is a view illustrating a case included in the optical sensor of the embodiment of the present invention.

FIG. 3 is a view illustrating a configuration of an optical system in the optical sensor 100 of the embodiment of the present invention. FIG. 4 is a view illustrating the case 2 included in the optical sensor 100 of the embodiment of the present invention. Referring to FIGS. 3 and 4, the light projecting module 4, light receiving lens unit 7, and the light receiving unit 8 are each independently and directly fixed to the case 2.

The circuit board 10 is a rigid flexible board. The circuit board 10 is accommodated in the case 2 while a flexible print board is bent. The circuit board 10 is disposed while separated from the light projecting module 4 and the light receiving lens unit 7. Additionally, the circuit board 10 is disposed away from the light receiving unit 8 (the light receiving element).

For example, a groove or a protrusion is formed in the case 2 in order to determine the positions of the light projecting module 4, the light receiving lens unit 7, and the light receiving unit 8 in the case 2. The light projecting module 4, the light receiving lens unit 7, and the light receiving unit 8 are fixed to the case 2 by an ultraviolet-curing adhesive 11 (also called a UV adhesive). In FIG. 3 and the subsequent drawings, a rough area to which the ultraviolet-curing adhesive is applied is indicated by a broken-line surrounding. In order to avoid complication of the drawings, the area to which the ultraviolet-curing adhesive 11 is applied is indicated only for the light receiving lens unit 7 and the light receiving unit 8 in FIG. 3.

Generally the ultraviolet-curing adhesive has a small linear expansion coefficient. Temperature compensation can be ensured (a position change due to a temperature is prevented) by fixing the light receiving unit 8 using the ultraviolet-curing adhesive. It is difficult to fix the circuit board to the case using the ultraviolet-curing adhesive while the light receiving element is mounted on the circuit board. In the embodiment, since the light receiving unit 8 is a light receiving element disposed while separated from the circuit board, the light receiving unit 8 can be fixed using the ultraviolet-curing adhesive 11.

Figure 5:
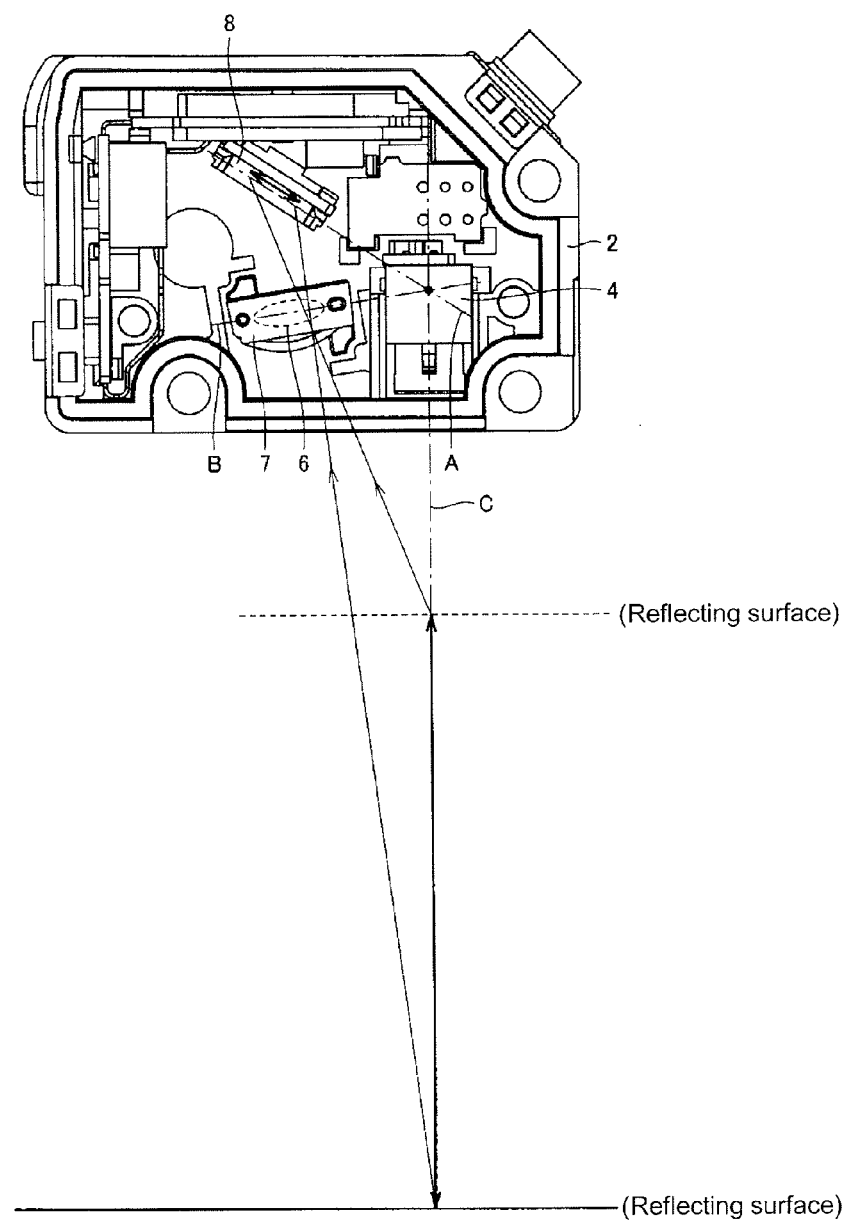
FIG. 5 is a view explaining a disposition of the optical system in the optical sensor of the embodiment of the present invention.

FIG. 5 is a view explaining a disposition of the optical system in the optical sensor 100 of the embodiment of the present invention. Referring to FIG. 5, a light receiving plane A of the light receiving unit 8 and a principal plane B of the light receiving lens 6 intersect each other on a certain straight line. In FIG. 5, the straight line is indicated by an intersection point of the two straight lines. According to a Scheimpflug principle, a subject plane C that is in focus also intersects the light receiving plane A of the light receiving unit 8 and the principal plane B of the light receiving lens 6 on the straight line. In FIG. 5, the subject plane C is indicated as a straight line matched with the optical axis of the light projecting module 4.

The light projected from the light projecting module 4 is reflected by a reflecting surface, and enter the light receiving unit 8 through the light receiving lens 6. Because the subject plane is not parallel to the principal plane of the light receiving lens, the reflecting surface located near the optical sensor 100 and the reflecting surface located distant from the optical sensor 100 can simultaneously be in focus. Accordingly, the optical sensor 100 of the embodiment of the present invention can measure, for example a height of an object. Alternatively the optical sensor 100 can be used to detect existence or non-existence of the object.

Figure 6:
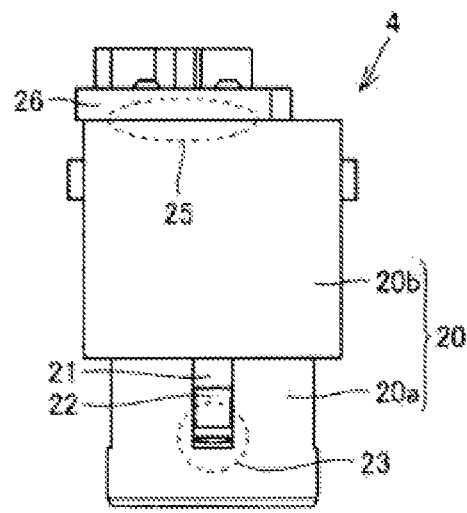
FIG. 6 is an outside drawing of a light projecting module in FIG. 1.
Figure 7:
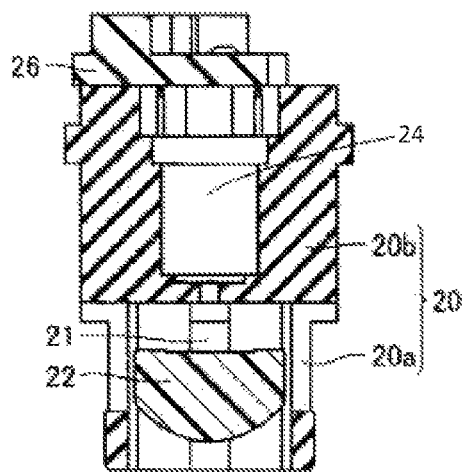
FIG. 7 is a view illustrating an inside of the light projecting module in FIG. 6.
Figure 8:
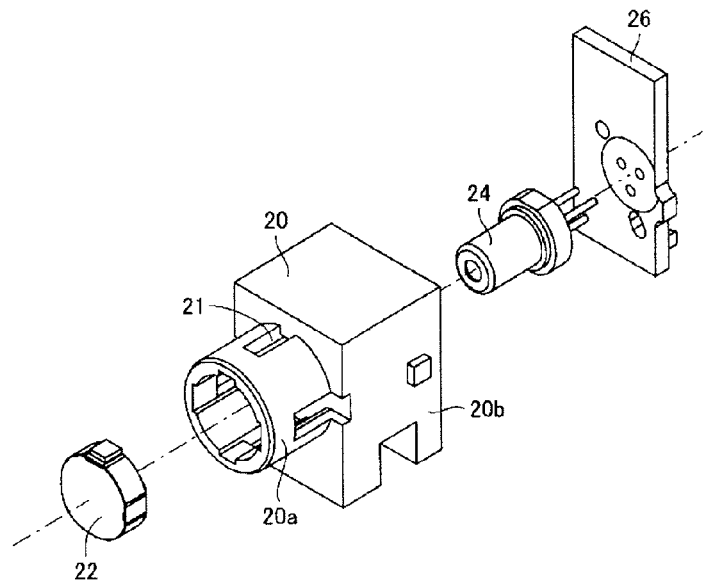
FIG. 8 is an exploded perspective view of the light projecting module in FIG. 6.

FIG. 6 is an outside drawing of the light projecting module 4 in FIG. 1. FIG. 7 is a view illustrating an inside of the light projecting module 4 in FIG. 6. FIG. 8 is an exploded perspective view of the light projecting module 4 in FIG. 6. Referring to FIGS. 6 to 8, the light projecting module 4 includes a light projecting lens 22, a laser diode 24 (the light emitting unit), a light projecting unit holder 20, and an LD board 26.

The light projecting module 4 includes the light projecting unit holder 20 made of a glass-fiber reinforced resin, the light projecting lens 22 made of a resin, and the laser diode 24 that is of the light emitting unit. For example, the resin similar to that of the case 2 is used for the light projecting unit holder 20, or another material having the equal linear expansion coefficient may be used. The light projecting lens 22 is isotropically held down by and fixed to the light projecting module 4 in the direction perpendicular to the optical axis. For example, after the light projecting lens 22 is press-fitted in the optical axis direction, the light projecting lens 22 is fixed while being held down in the optical axis direction or adhered thereto. In the fixing, the light projecting lens 22 may isotropically be held down in the direction perpendicular to the optical axis such that there is not left after the insertion the degree of movement freedom of the inside member due to the expansion in a specific or arbitrary one direction perpendicular to the optical axis. Therefore, even if the press-fitted member is made of the resin, the movement of the center position due to the temperature change becomes very small in the direction perpendicular to the optical axis. Specifically, the light projecting unit holder 20 includes a lens holding unit 20a that holds the light projecting lens 22 and a light emitting unit holding unit 20b that holds the laser diode 24. The lens holding unit 20*a* is formed into a cylindrical shape. A slide hole 21 is made to the lens holding unit 20*a* along an extending direction of the lens holding unit 20*a* in order to slide the light projecting lens 22 in the lens holding unit 20*a*.

The light projecting lens 22 is accommodated in the lens holding unit 20*a*, and the light projecting lens 22 is fixed using an ultraviolet-curing adhesive 23 while abutting on the surface perpendicular to the optical axis direction of the light projecting unit holder 20. Similarly, the laser diode 24 is accommodated in the light emitting unit holding unit 20*b*. For example, the laser diode 24 is press-fitted in the light emitting unit holding unit 20*b*, and held by the LD board 26 in the optical axis direction of the light projecting unit holder 20, thereby fixing the laser diode 24.

A hole to which a terminal of the laser diode 24 is inserted is made in the LD board 26. The LD board 26 is fixed to the light emitting unit holding unit 20*b* using, for example an ultraviolet-curing adhesive 25 while the terminal of the laser diode 24 is inserted in the hole of the LD board 26, whereby the laser diode 24 is fixed. The LD board 26 acts as a holding member that fixes the light emitting unit accommodated in the light projecting unit holder 20. However, the holding member is not limited to the LD board.

A disposition of such an optical system as the light emitting unit (for example, the laser diode), the light projecting lens, the light receiving lens, and the light receiving unit (the light receiving element) has an influence on detection performance of the optical sensor. Alignment of the optical system is adjusted during assembly of the optical sensor 100.

On the other hand, the light emitting unit generates heat while emitting the light. Even if the alignment of the optical system is adjusted once, the alignment possibly deviates due to the heat generation of the light emitting unit. The temperature changes depending also on a usage environment. Particularly, when a position gap is generated between the light emitting unit and the light projecting lens, the detection performance of the optical sensor 100 is largely influenced because an influence on a light receiving system arises. Accordingly, it is necessary to reduce the position gap between the light emitting unit and the light projecting lens as much as possible.

In the embodiment, the base, the light projecting lens holder, and the light receiving lens holder are made of the glass-fiber reinforced resin. Alternatively, the base, the light projecting lens holder, and the light receiving lens holder all may be made of a resin that does not include the glass fiber.

Figure 9:
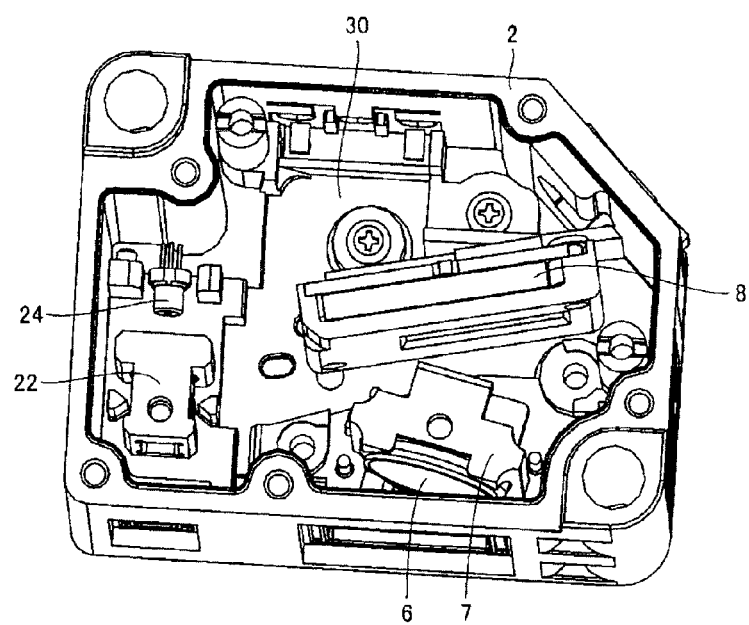
FIG. 9 is a view illustrating a conventional example of a configuration that reduces a position gap between a light emitting unit and the light projecting lens due to heat generation of the light emitting unit.

FIG. 9 is a view illustrating a conventional example of a configuration that reduces the position gap between the light emitting unit and the light projecting lens due to the heat generation of the light emitting unit. Referring to FIG. 9, the laser diode 24, the light projecting lens 22, the light receiving lens unit 7 (the light receiving lens 6), and the light receiving unit 8 are attached to a base 30. The optical element is accommodated in the case 2 by attaching the base 30 to the case 2.

The base 30 is made of metal (for example, aluminum). The heat generated by the laser diode 24 is released by the base 30. Therefore, the position gap between the laser diode 24 and the light projecting lens 22 can be reduced. However, production cost of the optical sensor increases because the number of components increases.

The optical element is accommodated in the case 2 after once attached to the base 30. For example, in placing the optical sensor 100 in a production line, a user adjusts an angle of the optical sensor 100 with respect to a horizontal surface or an angle in a right-left direction of the optical sensor 100 from, for example an outer shape of the case 2. Possibly the detection performance (for example, the detection performance in the direction perpendicular to the light projecting window of the case 2) determined from the outer shape of the case 2 degraded for such the reasons as the position gap in attaching the case 2 to the base 30. Possibly the degradation of the detection performance becomes problem in a detection requiring high-accuracy (for example, in the case of detecting munute height).

On the other hand, in the embodiment of the present invention, the base is not required. That is, the case 2 works also as the base. The light projecting module 4, the light receiving lens unit 7 that holds the light receiving lens 6, and the light receiving unit 8 are directly attached to the case 2. Therefore, the number of components and assembly man-hours can be reduced, so that the production cost of the optical sensor can be reduced.

The base is made of metal from the viewpoint of the heat release as described above. In the embodiment of the present invention, downsizing and weight reduction of the optical sensor can be achieved by eliminating the necessity of the base.

A possibility of degrading the optical sensor detection performance determined from the outer shape of the case 2 is reduced by eliminating the necessity of the base. Accordingly, the adjustment (for example, the adjustments of the position, the angle with respect to the horizontal surface, and the angle in the right-left direction) of the optical sensor can easily be performed in order to ensure the detection accuracy.

The case 2 is made of the material having the small linear expansion coefficient. In one embodiment, the case 2 is made of a resin having the linear expansion coefficient that is less than or equal to the linear expansion coefficient of a die-casting metal. In the configuration, the expansion of the case 2 due to the heat generation of the light emitting unit (the laser diode 24) can be reduced as much as possible. Accordingly, misalignment can be reduced among the light projecting module 4, the light receiving unit 8, and the light receiving lens unit 7. Usually the base is made of aluminum, and produced by, for example die-casting. The case 2 is made of the resin having the linear expansion coefficient that is less than or equal to the linear expansion coefficient of the die-casting metal, which allows the thermal expansion of the case 2 due to the heat generation of the laser diode 24 to be equal to or less than the thermal expansion of the base member. Accordingly, misalignment can be reduced among the light projecting module 4, the light receiving unit 8, and the light receiving lens unit 7 which are directly fixed to the case 2.

Further according to the embodiment of the present invention, the light emitting unit (the laser diode 24) and the light projecting lens 22 are integral with the light projecting module 4. The position gap between the laser diode 24 and the light projecting lens 22 due to the heat generation of the laser diode 24 during the emission of the laser diode 24 or the change of ambient temperature can be reduced because the laser diode 24 and the light projecting lens 22 are integral with the light projecting module 4.

Preferably the light projecting unit holder 20 that holds the laser diode 24 and the light projecting lens 22 is made of a material having the small linear expansion coefficient. Similarly to the case 2, the light projecting unit holder 20 is made of the resin having the linear expansion coefficient that is less than or equal to the linear expansion coefficient of the die-casting metal.

Therefore, the position gap between the laser diode 24 and the light projecting lens 22 can be reduced when the temperature of the laser diode 24 rises. For example, the light projecting unit holder 20 can be made of, for example glass-fiber reinforced PPE (polyphenylen ether).

The light projecting lens 22 is held in the lens holding unit 20a of the light projecting unit holder 20. Before the light projecting lens 22 is fixed, the light projecting lens 22 can be slid in the lens holding unit 20a. Therefore, a distance from the laser diode 24 to the light projecting lens 22 can be adjusted.

As described above, the optical sensor 100 includes the semiconductor integrated circuit. The semiconductor integrated circuit also generates heat during operation, similarly to the laser diode. Accordingly, it is necessary that the semiconductor integrated circuit be disposed in the case 2 while separated from the optical system as much as possible. Particularly, the semiconductor integrated circuit is preferably disposed distant from the light projecting module 4.

Figure 10A:
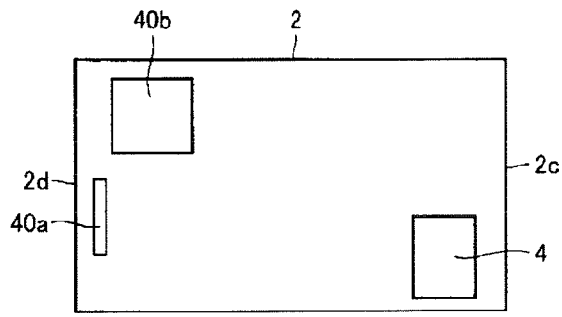
FIGS. 10A and 10B are schematic diagrams explaining a disposition relationship between a semiconductor integrated circuit and the light projecting module.
Figure 10B:
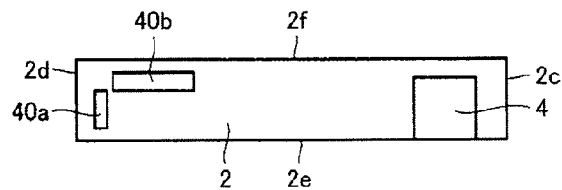

FIGS. 10A and 10B are schematic diagrams explaining the disposition relationship between the semiconductor integrated circuit and the light projecting module. FIG. 10A is a perspective view illustrating the inside of the case when viewed from above the light projecting module 4, and FIG. 10B is a perspective view illustrating the inside of the case when viewed from an optical axis direction of the light projecting module 4. Referring to FIG. 10, for example, the light projecting module 4 is disposed close to one side surface 2c of the case 2. A semiconductor integrated circuit 40a can be disposed close to another side surface 2d opposed to the side surface 2c of the case 2. The light projecting module 4 is attached to a side surface 2e of the case 2. A semiconductor integrated circuit 40b can be disposed close to side surfaces 2d and 2f of the case 2. The side surface 2f is opposed to the side surface 2e. In FIG. 10, the circuit board on which the semiconductor integrated circuits 40a or 40b are mounted is not illustrated for the purpose of easy understanding of the positions of the semiconductor integrated circuits 40a and 40b.

Figure 11:
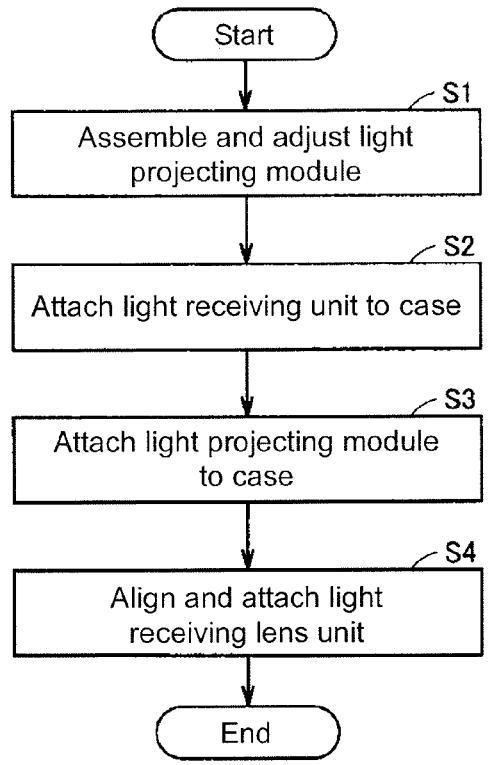
FIG. 11 is a flowchart for explaining a method for assembling the optical sensor of the embodiment of the present invention.

FIG. 11 is a flowchart for explaining a method for assembling the optical sensor of the embodiment of the present invention. Particularly, a method for fixing the optical component to the case is explained in FIG. 11. Referring to FIG. 11, in Step S1, the light projecting module 4 is assembled and adjusted. Specifically, the laser diode 24 and the light projecting lens 22 are inserted in the light projecting unit holder 20. The LD board 26 is attached to the light projecting unit holder 20. The ultraviolet-curing adhesive 25 is applied to the light projecting unit holder 20 and the LD board 26, and the ultraviolet-curing adhesive 25 is irradiated with an ultraviolet ray. Therefore, the laser diode 24 is held by the light projecting unit holder 20.

The position of the light projecting lens 22 is adjusted by moving the light projecting lens 22 in the lens holding unit 20a. When the position of the light projecting lens 22 is determined, the ultraviolet-curing adhesive 23 is applied to the lens holding unit 20a (the position of the slide hole 21 corresponding to the position of the light projecting lens 22) for fixing the light projecting lens 22, and the light projecting lens 22 is fixed by irradiating the ultraviolet-curing adhesive 23 with the ultraviolet ray.

In Step S2, the light receiving unit 8 is attached to the case 2. In Step S3, the light projecting module 4 is attached to the case 2.

In Step S4, the alignment of the receiving lens unit 7 is performed in the case 2, and the receiving lens unit 7 is attached to the case 2.

According to the embodiment of the present invention, it is not necessary to adjust the alignment between the light projecting lens 22 and the laser diode 24 after the light projecting module 4 is attached to the case 2. The possibility of degrading the optical sensor detection performance determined from the outer shape of the case 2 can also be reduced from this viewpoint.

The embodiment is described only by way of example, and should be considered not restrictive. The scope of the present invention is expressed not by the above description but by the claims, and it is intended that the meanings equivalent to the claims and all the changes within the claims are included in the present invention.

What is claimed is:

1. An optical sensor comprising:
   a case;
   a light projector comprising a light emitter, a light projecting lens, and a light projecting lens holder configured to hold the light projecting lens;
   a light receiver configured to receive reflected light of light projected from the light projector; and
   a light receiver lens configured to form an image of the reflected light on the light receiver,
   wherein the light projector, the light receiver, and the light receiver lens are each independently and directly fixed to the case, and
   wherein the light projector comprises:
   a light projector holder in which the light emitter and the light projecting lens are accommodated; and
   a holder configured to fix the light emitter accommodated in the light projector holder,
   the holder and the light projecting lens are fixed to the light projector holder using an ultraviolet curing adhesive,
   the light receiver comprises a light receiving sensor that is disposed away from a circuit board, and
   the light receiving sensor is fixed to the case using the ultraviolet curing adhesive.

2. The optical sensor according to claim 1, wherein, in the light projector, the light projecting lens is isotropically held down by and fixed to the light projecting lens holder in a direction perpendicular to an optical axis defined by the light projecting lens and the light emitter,
   the light receiver lens comprises a light receiving lens and a light receiving lens holder configured to hold the light receiving lens, the light receiving lens is isotropically held down by and fixed to the light receiving lens holder in the direction perpendicular to an optical axis defined by the light receiving lens and the light receiver, and
   the base, the light projecting lens holder, and the light receiving lens holder are all made of a resin or a glass-fiber reinforced resin.

3. The optical sensor according to claim 2, wherein the case is made of a glass-fiber reinforced resin,
   the light projecting lens is made of a resin,
   the light projecting lens holder is made of the glass-fiber reinforced resin,
   the light receiver lens is made of the resin, and
   the light receiving lens holder is made of the glass-fiber reinforced resin.

4. The optical sensor according to claim 2, wherein the light projector holder comprises a cylindrical structure in which the light projecting lens is configured to be able to slide inside thereof, and
   the light projecting lens is fixed to an inside of the cylindrical structure.

5. The optical sensor according to claim 1, wherein the case is made of a resin having a linear expansion coefficient that is less than or equal to a linear expansion coefficient of a die casting metal.

6. The optical sensor according to claim 1, wherein the light projector, the light receiver lens, and the light receiver are disposed such that a principal plane of a light receiving lens comprised in the light receiver lens, a light receiving plane of the light receiver, and the optical axis of the light projector intersect one another at one point.

7. The optical sensor according to claim 1, further comprising a semiconductor integrated circuit configured to process a light reception signal from the light receiver,
wherein the semiconductor integrated circuit is disposed in the case while separated from the light projector.

8. An optical sensor comprising:
a case;
a light projector comprising a light emitter, a light projecting lens, and a light projecting lens holder configured to hold the light projecting lens;
a light receiver configured to receive reflected light of light projected from the light projector; and
a light receiver lens configured to form an image of the reflected light on the light receiver,
wherein the light projector, the light receiver, and the light receiver lens are each independently and directly fixed to the case,
wherein the light projector comprises:
a light projector holder in which the light emitter and the light projecting lens are accommodated; and
a holder configured to fix the light emitter accommodated in the light projector holder,
the holder and the light projecting lens are fixed to the light projector holder using an ultraviolet curing adhesive,
the light receiver comprises a light receiving sensor that is disposed away from a circuit board, and
the light receiving sensor is fixed to the case using the ultraviolet curing adhesive, and
wherein the light projector holder is made of a resin having a linear expansion coefficient that is less than or equal to a linear expansion coefficient of a die casting metal.

* * * * *